US00RE39962E

(19) United States
(12) Reissued Patent
Yoon

(10) Patent Number: US RE39,962 E
(45) Date of Reissued Patent: Dec. 25, 2007

(54) METHOD AND APPARATUS FOR CONTROLLING POWER CONSUMPTION IN A TILT CORRECTING COIL

(75) Inventor: Yeo-Chang Yoon, Seoul (KR)

(73) Assignee: Samsung Electronics Co., Ltd., Suwon-si, Gyeonggi-do (KR)

(21) Appl. No.: 10/022,211

(22) Filed: Dec. 20, 2001

Related U.S. Patent Documents

Reissue of:
(64) Patent No.: 6,141,627
Issued: Oct. 31, 2000
Appl. No.: 09/066,532
Filed: Apr. 27, 1998

(30) Foreign Application Priority Data

Apr. 26, 1997 (KR) ..... 97-15728

(51) Int. Cl.
*G06F 1/32* (2006.01)

(52) U.S. Cl. ..... 702/89; 315/8; 315/368.21; 315/371

(58) Field of Classification Search ..... 702/89; 713/323, 322, 324; 315/8, 364, 368.1, 370, 315/371
See application file for complete search history.

(56) References Cited

U.S. PATENT DOCUMENTS 4,296,359 A 10/1981 Dodds
4,899,082 A 2/1990 Sands et al.
5,021,712 A 6/1991 Sands et al.
5,481,732 A * 1/1996 Shahbazi ..... 713/323
5,603,040 A * 2/1997 Frager et al. ..... 713/323
5,714,843 A * 2/1998 Youn ..... 315/1
5,938,770 A * 8/1999 Kim ..... 713/300

* cited by examiner

*Primary Examiner*—John Barlow
*Assistant Examiner*—Hien Vo
(74) *Attorney, Agent, or Firm*—Robert E. Bushnell, Esq.

(57) ABSTRACT

[A method for controlling the power consumption in a tilt correcting coil is disclosed. The power consumption is corrected] *Controlling power consumption* in the tilt correcting coil [for correcting] *to correct* the tilt of [the] images [of] *on* the cathode ray tube. [If] *When* a microcomputer judges that the mode is the on-state mode, [then] the microcomputer outputs a tilt correcting PWM signal in accordance with the user's [inputting] *input*. [Then the] *The* output tilt correcting PWM signal is converted into a dc voltage, and the level is adjusted. Then the signal is supplied to the tilt correcting coil, so that the tilt of the image on the screen [would be] *is* corrected. In the [cases of the] standby mode, [the] suspend mode [and/or the] *or* power-off mode, the microcomputer outputs a signal [which has a function of minimizing the] *to minimize* power consumption [of] *by* the tilt correcting coil. [Therefore, the tilt] *Tilt* of the image of the screen is corrected in the normal manner[. On the other hand,] *in the on-state mode and,* in [the cases of] the standby mode, [the] suspend mode [and/or the] *or* power-off mode, the tilt correcting coil does not consume any power, thereby satisfying the power consumption definition of the power-off mode.

57 Claims, 3 Drawing Sheets

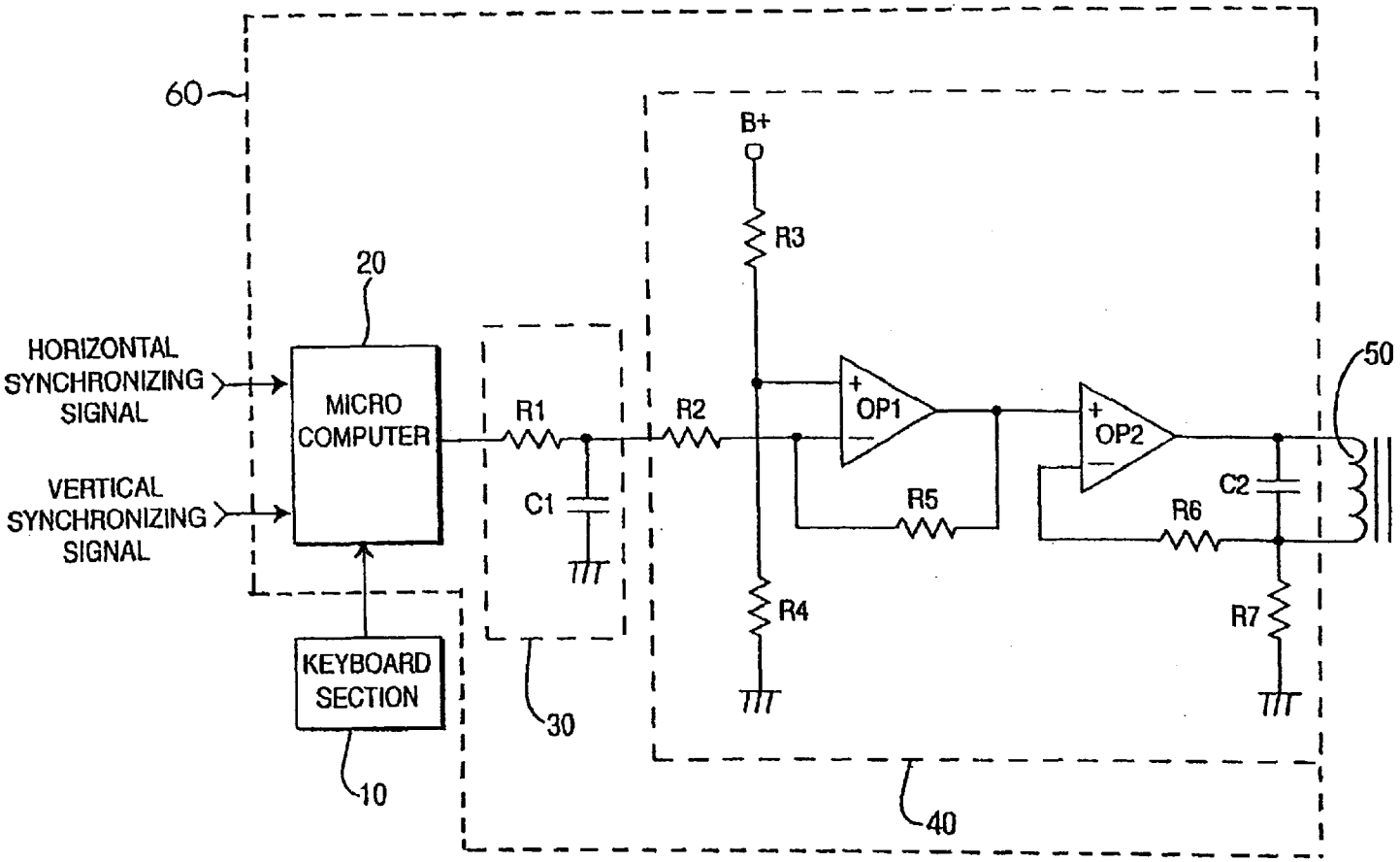
FIG. 1A (New)

FIG. 2 (Amended)
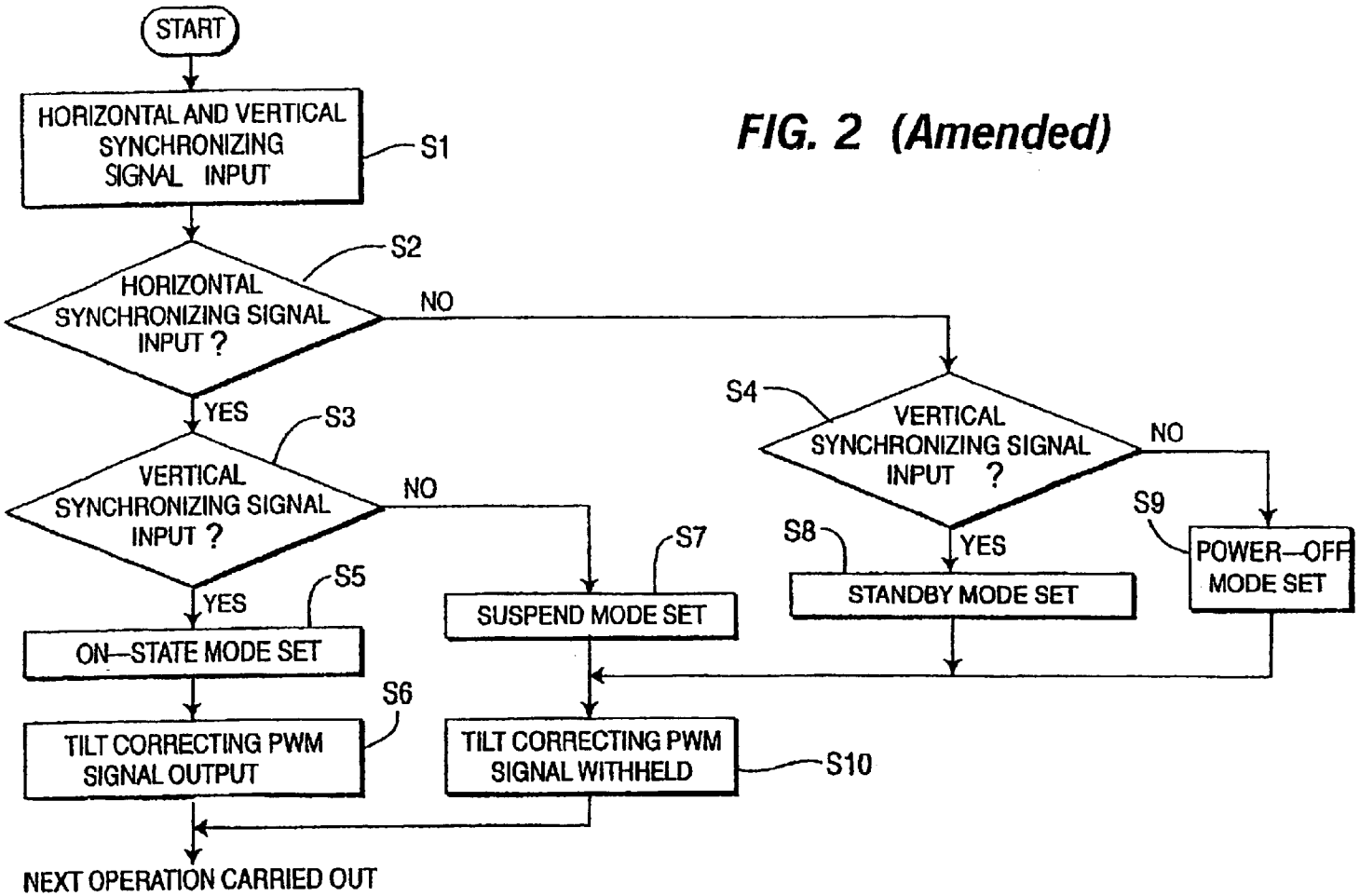

METHOD AND APPARATUS FOR CONTROLLING POWER CONSUMPTION IN A TILT CORRECTING COIL

Matter enclosed in heavy brackets [ ] appears in the original patent but forms no part of this reissue specification; matter printed in italics indicates the additions made by reissue.

CLAIM OF PRIORITY

This application makes reference to, incorporates the same herein, and claims all benefits accruing under 35 U.S.C. §119 from an application entitled Method For Controlling Power Consumption In Tilt Correcting Coil earlier filed in the Korean Industrial Property Office on Apr. 26, 1997, and there duly assigned Serial No. 15728/1997.

BACKGROUND OF THE INVENTION

1. Field of the Invention

The present invention relates to a monitor which includes a cathode ray tube as an image displaying device, and is a peripheral equipment of a computer system, and more particularly, the present invention relates to a method and apparatus for controlling the power consumption in a tilt correcting coil for correcting the tilt of the images of the cathode ray tube, in which the power consumption is corrected in the tilt correcting coil.

2. Description of Related Art

Generally, a monitor is a peripheral equipment which makes it possible for the user to monitor and confirm the operating state of the computer system. The computer system outputs data signals indicative of the current operation, while the monitor receives the data signals to display them on the screen of the cathode ray tube. When the monitor displays the data signals as image signals on the screen, horizontal and vertical synchronizing signals are utilized. Therefore, the computer system outputs horizontal and vertical synchronizing signals as well as data signals.

When the user leaves the computer system for a while to take a break or perform some other business, the computer system remains with the power turned on. Thus, when the computer system is idle, as in the above described case, the computer system consumes more power than necessary. Therefore, conventional computer systems monitor the activity of a keyboard, a mouse or modem to determine whether the user is using the computer system.

When it is determined that the keyboard and/or mouse have remained inactive for a predetermined time period, power consumption is reduced based on the time period of inactivity. That is, the computer system is sequentially operated in several power modes depending on the time period of inactivity. In an on-state mode during user activity normal power consumption occurs, during periods of inactivity power consumption is reduced by sequentially operating in a standby mode, a suspend mode and a power-off mode. When the activity of the keyboard and/or mouse is again detected, the on-state mode of the computer system is resumed.

Meanwhile, the Video Electronics Standard Association (VESA) of the United States proposes a display power management system (DPMS) which is capable of managing the monitor power for the current mode and capable of reducing power consumption. The DPMS is capable of managing the power supplied to the respective sections of the computer based on the state of use (activity state) of the computer system. The computer system selectively outputs horizontal and vertical synchronizing signals in accordance with the power supply mode of the DPMS.

The monitor operates under an on-state mode, a standby mode, a suspend mode or a power-off mode in accordance with the presence or absence of the horizontal and vertical synchronizing signals. That is, when both the horizontal and vertical synchronizing signals are output, the monitor operates under the on-state mode. When the horizontal synchronizing signals are not output, but only the vertical synchronizing signals are output, the monitor operates under the standby mode. When the vertical synchronizing signals are not output, but only the horizontal synchronizing signals are output, the monitor operates under the suspend mode. When neither the horizontal nor vertical synchronizing signals are output, the monitor operates under the power-off mode.

When the monitor operates under the on-state mode, power consumption of the monitor is about 80–100 W. Under the standby mode, it is about 65 W or less. Under the suspend mode, it is about 25 W or less. Under the power-off mode, it is about 5 W or less.

When the monitor displays images on the screen, the images can be tilted due to a deflection inaccuracy or the like. Therefore, the neck portion of the cathode ray tube is provided with a tilt correcting coil together with deflection coils to generate deflection magnetic fields. Owing to the function of this tilt correcting coil, the images are displayed on the screen in a correct form.

In the above described monitor, conventionally, the tilt correcting coil receives tilt correcting signals continuously to correct the tilts of the images, regardless of the DPMS modes. The power consumption of the tilt correcting coil is pretty high. That is, it is as high as 2–3 W. Therefore, under the power-off mode, the power consumption definition of the DPMS cannot be satisfied due to the power consumption of the tilt correcting coil.

Further, under the standby mode and the suspend mode, no image is displayed on the screen. However, the tilt correcting coil receives the tilt correcting signals continuously, with the result that power is squandered.

SUMMARY OF THE INVENTION

The present invention is intended to overcome the above described disadvantages of the conventional technique.

Therefore it is an object of the present invention to provide a method for controlling the power consumption in a tilt correcting coil, in which the power consumption in the tilt correcting coil is eliminated when the DPMS mode is one of the standby mode, the suspend mode, and the power-off mode.

It is another object of the present invention to provide an apparatus for controlling the power consumption in a tilt correcting coil of a monitor operable in a DPMS mode, wherein the DPMS mode is one of a standby mode, suspend mode, and power-off mode, by preventing a tilt correcting pulse width modulated (PWM) signal from being provided to the tilt correcting coil.

In achieving the above objects, the present invention is characterized in that a microcomputer determines the current DPMS mode in accordance with the presence or absence of horizontal and vertical synchronizing signals input from the computer system. If the microcomputer determines that the mode is the on-state mode, then the microcomputer outputs the tilt correcting PWM signal. Then the output tilt correcting PWM signal is converted into a dc (direct current)

voltage, and the level is adjusted. Then the signal is supplied to the tilt correcting coil, so that the tilt of the image on the screen is corrected. When it is determined that the DPMS mode is one of the standby mode, the suspend mode and the power-off mode, the microcomputer outputs a signal having a predetermined logic level for minimizing the power consumption of the tilt correcting coil.

Therefore, according to the present invention, the tilt of the image of the screen is corrected in the normal manner *in the on-state mode*. On the other hand, in the cases of the standby mode, the suspend mode or the power-off mode, the tilt correcting coil does not consume any power, thereby satisfying the power consumption definition of the power-off mode.

BRIEF DESCRIPTION OF THE DRAWINGS

The above object and other advantages of the present invention will become more apparent by describing in detail the preferred embodiment of the present invention with reference to the attached drawings in which:

*FIGS. 1 and 1A illustrate* an embodiment of a circuit to which the method for controlling the power consumption according to the present invention is applied; and FIG. 2 is a signal flow chart showing the operation of the microcomputer of [FIG. 1] *FIGS. 1 and 1A*, which is used for controlling the power consumption according to the present invention.

DETAILED DESCRIPTION OF THE PREFERRED EMBODIMENT

Figure 1:
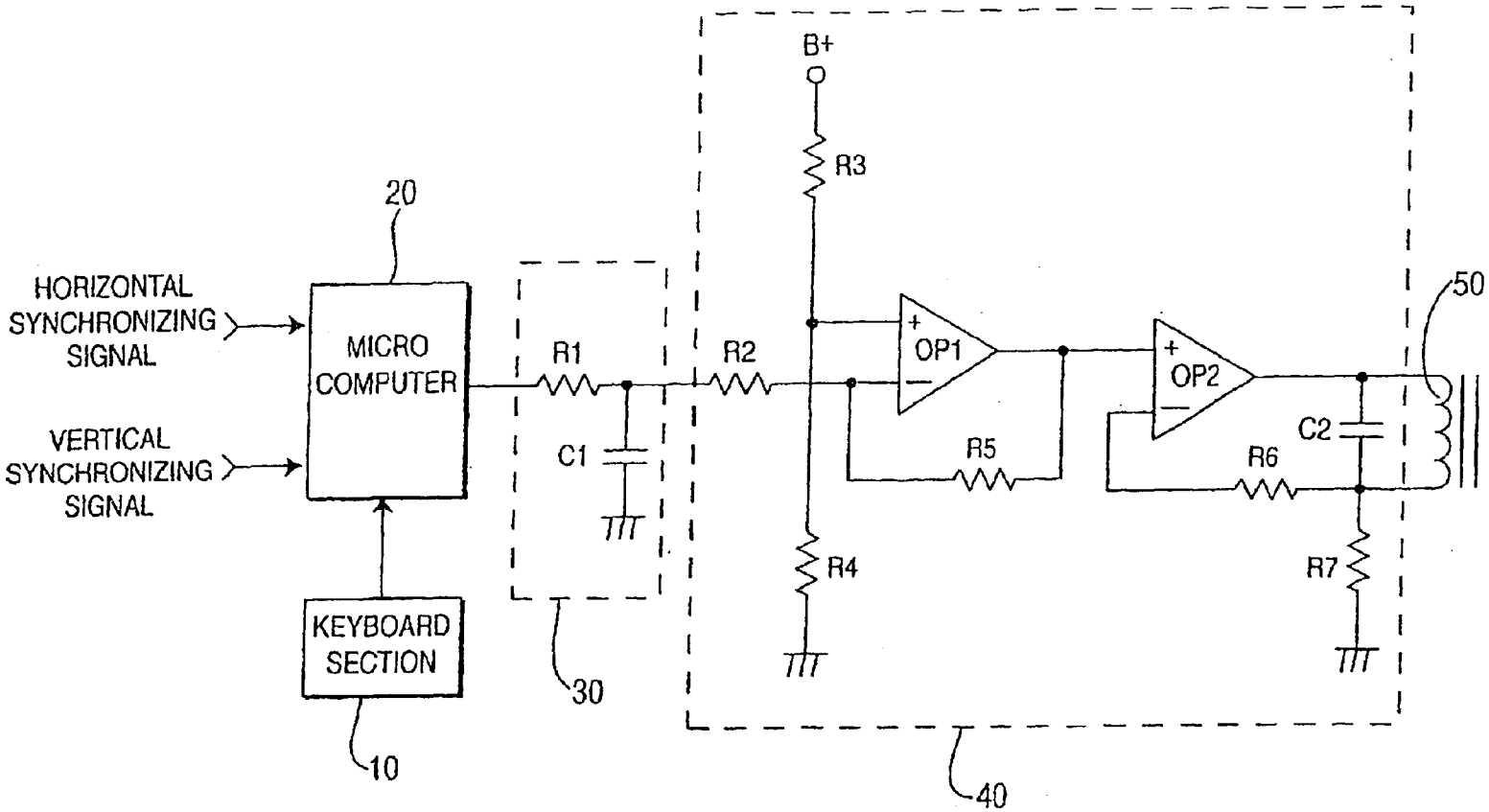
[FIG. 1 illustrates]

Referring to [FIG. 1] *FIGS. 1 and 1A*, [a circuit] *circuitry 60 including tilt correcting signal circuitry* for controlling the power consumption comprises: a microcomputer 20 for controlling the DPMS operations of a monitor in accordance with the presence and absence of horizontal and vertical synchronizing signals input from a computer system, and for setting a tilt correcting value for the images of the screen in accordance with key signals of a keyboard *or keyboard section 10* and outputting [a] tilt correcting pulse width modulated (PWM) signals; an integrator 30 for converting the tilt correcting PWM signals output from microcomputer 20 to dc voltages; *and* a tilt correcting signal outputting section 40 for amplifying the output voltages of integrator 30 to output tilt correcting signals[; and a]. *A* tilt correcting coil 50 [for correcting] *corrects* the tilt of the images of the screen in accordance with the output voltages of tilt correcting signal outputting section 40.

Integrator 30 includes a resistor R1 connected to a ground terminal via a capacitor C1. An output terminal of microcomputer 20 is connected to a resistor R2 of tilt correcting signal outputting section 40 via resistor R1.

Tilt correcting signal outputting section 40 is constituted as follows. An output terminal at the node connecting resistor R1 and capacitor C1 of the integrator 30 is connected via resistor R2 to an inverting input terminal (−) of an arithmetic amplifier OP1. A dividing circuit comprised of a resistor R3 and a resistor R4 connected in series between a power source B+ and the ground terminal. A connection node between resistors R3 and R4 is connected to a non-inverting input terminal (+) of the arithmetic amplifier OP1. An output terminal of the arithmetic amplifier OP1 is connected through a feedback resistor R5 to its inverting input terminal (−). At the same time, the output terminal of the arithmetic amplifier OP1 is also connected to a non-inverting input terminal (+) of another arithmetic amplifier OP2. An output terminal of the arithmetic amplifier OP2 is connected through a capacitor C2 to a grounding resistor R7. A connection node between capacitor C2 and resistor R7 is connected to the inverting input terminal (−) of arithmetic amplifier OP2 via a feedback resistor R6. Capacitor C2 is connected in parallel to tilt correcting coil 50. Accordingly, one terminal of tilt correcting coil 50 is connected to the output terminal of arithmetic amplifier OP2 and the other terminal of tilt correcting coil 50 is connected to the inverting terminal (−) of arithmetic amplifier OP2 via feedback resistor R6.

FIG. 2 is a signal flow chart showing the operation of microcomputer 20 which is used for controlling the power consumption according to the present invention.

At a step S1, once the computer system is initially started or after a resetting operation, microcomputer 20 receives horizontal and vertical synchronizing *or synchronization* signals from the computer system in a normal on-state mode. At steps S2–S4, the microcomputer 20 determines whether horizontal and vertical synchronizing signals are being input from the computer system.

If horizontal synchronizing signals are found to be input at the step S2, and if vertical synchronizing signals are found to be input at the step S3, then it is determined that the computer system operates is operating under the on-state mode. Therefore, at a step S5, the on-state mode of the monitor is set, and at step S6, microcomputer 20 outputs the tilt correcting PWM signal having a duty ratio corresponding to a pre-set tilt correcting value. The tilt correcting PWM signal output from microcomputer 20 is converted into a dc voltage by integrator 30, and the dc voltage of the tilt correcting PWM signal is supplied through the resistor R2 of tilt correcting signal outputting section 40 to the inverting input terminal (−) of arithmetic amplifier OP1. The power source B+ is divided by resistors R3 and R4, and this divided voltage is supplied to the non-inverting input terminal (+) of arithmetic amplifier OP1. Then arithmetic amplifier OP1 compares the divided voltage with the dc voltage level output from the integrator 30, amplifies it and inverts it. The output terminal of arithmetic amplifier OP1 is amplified again by arithmetic amplifier OP2. Then it is supplied to tilt correcting coil 50, so that the tilt of the images on the screen can be corrected.

Meanwhile, if it is determined at step s2 that the horizontal synchronizing signals are input, and if it is determined at step S3 that vertical synchronizing signals are not input, then microcomputer 20 sets the monitor in the suspend mode at a step S7.

If it is determined at step S2 that the horizontal synchronizing signals are not input, then at step S4, it is determined whether or not the vertical synchronizing signals are input from the computer system. If it is determined at step S4 that vertical synchronizing signals are input, then microcomputer 20 sets the monitor in the standby mode at step S8. If it is determined that the vertical synchronizing signals are not input at step S4, then microcomputer 20 sets the monitor in the power-off mode at a step S9.

Following the steps of setting the monitor in the standby mode (S8), the suspend mode (S7) or the power-off mode (S9), then at step S10 microcomputer 20 withholds, or does not generate, the tilt correcting PWM signals. That is, microcomputer 20 outputs a high potential continuously. When microcomputer 20 outputs the continuous high potential, integrator 30 continuously outputs a high potential, and this high potential is supplied through resistor R2 of tilt correcting signal outputting section 40 to the inverting input terminal (−) of arithmetic amplifier OP1. Then arithmetic amplifier OP1 outputs a continuous low potential, and arithmetic amplifier OP2 outputs a low potential, with the result that no electric current flows through tilt correcting coil 50.

According to the present invention as described above, in the case of the standby mode, the suspend mode and/or the power-off mode, that is, if there is no image on the screen, no electric current flows through the tilt correcting coil. Consequently, the power consumption of the monitor is reduced, and the DPMS definition for the power-off mode can be satisfied as to its power consumption.

What is claimed is:

1. A method for controlling power consumption in a tilt correcting coil of a monitor connected to a computer, said method comprising the steps of:

determining whether synchronization signals are received by said monitor from said computer;

operating said monitor in an on-state mode of a power supply mode of a display power management system (DPMS) when it is determined that said synchronization signals are received by said monitor;

providing a tilt correcting pulse width modulated signal to said tilt correcting coil when operating said monitor in said on-state mode;

operating said monitor in one of a suspended mode, a standby mode and a power-off mode of said power supply mode when it is determined that said synchronization signals are not received by said monitor; and preventing said tilt correcting pulse width modulated signal from being provided to said tilt correcting coil when operating said monitor in said one of said suspend, standby and power-off modes.

2. The method as set forth in claim 1, said step of determining whether synchronization signals are received by said monitor from said computer comprising the steps of:

determining whether a horizontal synchronization signal is received by said monitor; and then determining whether a vertical synchronization signal is received by said monitor.

3. The method as set forth in claim 2, further comprising the steps of:

operating in said on-state mode when it is determined that both said horizontal and vertical synchronization signals are received by said monitor;

operating in said suspend mode when it is determined that said horizontal synchronization signal is received by said monitor and it is determined that said vertical synchronization signal is not received by said monitor;

operating in said standby mode when it is determined that said horizontal synchronization signal is not received by said monitor and it is determined that said vertical synchronization signal is received by said monitor; and operating in said power-off mode when it is determined that said horizontal synchronization signal is not received by said monitor and it is determined that said vertical synchronization signal is not received by said monitor.

4. A method for controlling power consumption in a tilt correcting coil of a monitor connected to a computer, said monitor being operable in an on-state mode, a suspend mode and a power-off mode of a power supply mode of a display power management system (DPMS), said method comprising the steps of:

determining whether horizontal and vertical synchronization signals are received by said monitor from said computer;

operating said monitor in said on-state mode when it is determined that both of said horizontal and vertical synchronization signals are received by said monitor;

providing a tilt correcting pulse width modulated signal to said tilt correcting coil when operating said monitor in said on-state mode;

operating said monitor in one of said suspend and power-off modes when it is determined that at least one of said horizontal and vertical synchronization signals is not received by said monitor; and preventing said tilt corresponding pulse width modulated signal from being provided to said tilt correcting coil when operating said monitor in said one of said suspend and power-off modes.

5. The method as set forth in claim 4, further comprising the steps of:

operating in said suspend mode when it is determined that said horizontal synchronization signal is received by said monitor and it is determined that said vertical synchronization signal is not received by said monitor;

operating in a standby mode when it is determined that said horizontal synchronization signal is not received by said monitor and it is determined that said vertical synchronization signal is received by said monitor; and operating in said power-off mode when it is determined that said horizontal synchronization signal is not received by said monitor and it is determined that said vertical synchronization signal is not received by said monitor.

6. An apparatus for controlling power consumption in a tilt correcting coil of a monitor connected to a computer, said monitor being operable in any one of an on-state mode, a suspend mode, a standby mode and a power-off mode of a power supply mode of a display power management system (DPMS), said apparatus comprising:

a microcomputer in said monitor for receiving horizontal and vertical synchronizing signals output from said computer;

an integrator for receiving and converting a tilt correcting pulse width modulated signal output from said microcomputer into a direct current voltage signal;

a tilt correcting signal output circuit for outputting an amplified voltage signal by amplifying the direct current voltage signal output from said integrator, said amplified voltage signal being applied to said tilt correcting coil.

7. The apparatus as set forth in claim 6, said microcomputer outputting said tilt corresponding pulse width modulated signal when both said of horizontal and vertical synchronizing signals are output from said computer.

8. The apparatus as set forth in claim 6, said microcomputer outputting a signal having a constant high logic level, when either one *of* said [of] horizontal and vertical synchronizing signals are not output from said computer, for preventing said tilt correcting coil from consuming power.

9. The apparatus as set forth in claim 6, wherein said microcomputer determines said monitor is to operate in said on-state mode when both *of* said [of] horizontal and vertical synchronizing signals are output from said computer, and determines said monitor is to operate in one of said suspend, standby and power-off modes when at least one *of* said [of] horizontal and vertical synchronizing signals is not output from said computer;

said microcomputer outputting said tilt correcting pulse width modulated signal, when said monitor is determined to be operating in said on-state mode; and said microcomputer outputting a signal having a constant high logic level, when said monitor is determined to be operating in one of said suspend, standby and power-off modes, for preventing said tilt correcting coil from consuming power.

10. The apparatus as set forth in claim 9, wherein said integrator outputs a direct current voltage signal having a high logic level when said microcomputer outputs said signal having a constant high logic level, and said tilt correcting signal output circuit outputs an amplified voltage signal having a constant low logic level in response to said direct current voltage signal having a high logic level.

11. The apparatus as set forth in claim 6, further comprising:

said integrator comprising:

a first resistor connected between a first node and said microcomputer, and a capacitor connected between said first node and a ground terminal;

said tilt correcting signal output circuit comprising:

a first amplifier having a negative input terminal, a positive input terminal and an output terminal;

a second resistor connected between said first node and said negative input terminal *of said first amplifier*;

a dividing circuit connected between a power source and said ground terminal for providing a divided voltage signal to said positive input terminal *of said first amplifier*;

a feedback resistor connected between said negative input terminal and said output terminal *of said first amplifier*;

a second amplifier having a negative input terminal, a positive input terminal and an output terminal, said [negative] *positive* input terminal of said second amplifier being connected to said output terminal of said first amplifier;

said output terminal of said second amplifier being connected to a first terminal of said tilt correcting coil;

a second capacitor connected between said first terminal of said tilt correcting coil and a second terminal of said tilt correcting coil;

a ground resistor connected between said second terminal of said tilt correcting coil and said ground terminal; and a second feedback resistor connected between said second terminal of said tilt correcting coil and said negative input terminal of said second amplifier.

12. The apparatus as set forth in claim 6, further comprising:

a keyboard connected to said microcomputer, said microcomputer setting a tilt correcting value for images on a screen of said monitor in accordance with key signals output from said keyboard and outputting said tilt correcting pulse width modulated [(PWM) signals] *signal* in accordance [to] *with* said tilt correcting value.

*13. A method of controlling power consumption in a tilt correcting coil of a monitor including a normal operating mode and a power saving operating mode, comprising the steps of:*

*enabling said tilt correcting coil during said normal operating mode of said monitor; and*

*disabling said tilt correcting coil during said power saving operating mode of said monitor.*

*14. The method of controlling power consumption in accordance with claim 13, further comprising the step of:*

*determining whether a horizontal synchronization signal and a vertical synchronization signal are present.*

*15. The method of controlling power consumption in accordance with claim 14, further comprising the steps of:*

*providing a tilt correcting signal to said tilt correcting coil, said tilt correcting signal including an active state and an inactive state; and*

*said step of enabling said tilt correcting coil comprising: setting said tilt correcting signal in said active state when both of said horizontal synchronization signal and said vertical synchronization signal are present; and*

*said step of disabling said tilt correcting coil comprising: setting said tilt correcting signal in said inactive state when any of said horizontal synchronization signal and said vertical synchronization signal is not present.*

*16. The method of controlling power consumption in accordance with claim 14, further comprised of said tilt correcting signal comprising:*

*a tilt correcting pulse width modulated signal.*

*17. The method of controlling power consumption in accordance with claim 14, further comprised of:*

*said step of enabling said tilt correcting coil comprising: providing a tilt correcting signal to said tilt correcting coil when both of said horizontal synchronization signal and said vertical synchronization signal are present; and*

*said step of disabling said tilt correcting coil comprising: withholding said tilt correcting signal from being supplied to said tilt correcting coil when any of said horizontal synchronization signal and said vertical synchronization signal is not present.*

*18. The method of controlling power consumption in accordance with claim 17, further comprised of said tilt correcting signal comprising:*

*a tilt correcting pulse width modulated signal.*

*19. The method of controlling power consumption in accordance with claim 14, further comprised of said power saving operating mode comprising at least one of:*

*a suspend mode, a standby mode and a power-off mode each respectively corresponding to a power supply mode of a display power management system (DPMS) standard.*

*20. An apparatus for controlling power consumption in a tilt correcting coil of a monitor including a normal operating mode and a power saving operating mode, comprising:*

*a controller for enabling said tilt correcting coil during said normal operating mode of said monitor, and said controller for disabling said tilt correcting coil during said power saving operating mode of said monitor.*

*21. The apparatus for controlling power consumption according to claim 20, further comprised of:*

*said controller for determining whether a horizontal synchronization signal and a vertical synchronization signal are present.*

*22. The apparatus for controlling power consumption according to claim 21, further comprised of:*

*said controller for providing a tilt correcting signal to said tilt correcting coil, said tilt correcting signal including an active state and an inactive state, and said controller for setting said tilt correcting signal in said active state when both of said horizontal synchroniza-*

*tion signal and said vertical synchronization signal are present, and said controller for setting said tilt correcting signal in said inactive state when any of said horizontal synchronization signal and said vertical synchronization signal is not present.*

*23. The apparatus for controlling power consumption according to claim 22, further comprised of said tilt correcting signal comprising:*

*a tilt correcting pulse width modulated signal.*

*24. The apparatus for controlling power consumption according to claim 21, further comprised of:*

*said controller for providing a tilt correcting signal to said tilt correcting coil when both of said horizontal synchronization signal and said vertical synchronization signal are present, and said controller for withholding said tilt correcting signal from being supplied to said tilt correcting coil when any of said horizontal synchronization signal and said vertical synchronization signal is not present.*

*25. The apparatus for controlling power consumption according to claim 24, further comprised of said tilt correcting signal comprising:*

*a tilt correcting pulse width modulated signal.*

*26. The apparatus for controlling power consumption according to claim 21, further comprised of said power saving operating mode comprising:*

*a suspend mode, a standby mode and a power-off mode each respectively corresponding to a power supply mode of a display power management system (DPMS) standard.*

*27. A computer readable storage medium including a stored set of instructions for implementing a method of controlling power consumption in a tilt correcting coil of a monitor including a normal operating mode and a power saving operating mode, said stored set of instructions comprising one or more instructions for:*

*enabling said tilt correcting coil during said normal operating mode of said monitor; and*

*disabling tilt correcting coil during said power saving operating mode of said monitor.*

*28. The computer readable storage medium according to claim 27, further comprised of said stored set of instructions further comprising one or more instructions for:*

*determining whether a horizontal synchronization signal and a vertical synchronization signal are present.*

*29. The computer readable storage medium according to claim 28, further comprised of said stored set of instructions further comprising one or more instructions for:*

*providing a tilt correcting signal to said tilt correcting coil, said tilt correcting signal including an active state and an inactive state; and*

*said one or more instructions for enabling said tilt correcting coil comprising one or more instructions for:*

*setting said tilt correcting signal in said active state when both of said horizontal synchronization signal and said vertical synchronization signal are present; and*

*said one or more instructions for disabling said tilt correcting coil comprising one or more instructions for:*

*setting said tilt correcting signal in said inactive state when any of said horizontal synchronization signal and said vertical synchronization signal is not present.*

*30. The computer readable storage medium according to claim 29, further comprised of said one or more instructions for providing said tilt correcting signal comprising one or more instructions for:*

*providing a tilt correcting pulse width modulated signal.*

*31. The computer readable storage medium according to claim 28, further comprised of:*

*said one or more instructions for enabling said tilt correcting coil comprising one or more instructions for:*

*providing a tilt correcting signal to said tilt correcting coil when both of said horizontal synchronization signal and said vertical synchronization signal are present; and*

*said one or more instructions for disabling said tilt correcting coil comprising one or more instructions for:*

*withholding said tilt correcting signal from being supplied to said tilt correcting coil when any of said horizontal synchronization signal and said vertical synchronization signal is not present.*

*32. The computer readable storage medium according to claim 31, further comprised of said one or more instructions for providing a tilt correcting signal comprising one or more instructions for:*

*providing a tilt correcting pulse width modulated signal.*

*33. The computer readable storage medium according to claim 31, further comprised of said power saving operating mode comprising at least one of:*

*a suspend mode, a standby mode and a power-off mode each respectively corresponding to a power supply mode of a display power management system (DPMS) standard.*

*34. A method for controlling power consumption in a tilt correcting coil of a monitor, said method comprising the steps of:*

*providing a tilt correcting signal for correcting a tilt of an image to said tilt correcting coil of said monitor when operating said monitor in an on-state mode; and*

*reducing power consumption of said tilt correcting coil of said monitor by withholding said tilt correcting signal from being used by said tilt correcting coil of said monitor when operating said monitor in at least one of a suspend mode, a standby mode, and a power-off mode.*

*35. The method as set forth in claim 34, further comprised of said on-state mode, said suspend mode, said standby mode and said power-off mode each respectively corresponding to a power supply mode of a display power management system (DPMS).*

*36. The method as set forth in claim 34, further comprised of providing said tilt correcting signal to correspond to a tilt correcting pulse width modulated signal.*

*37. A method for controlling power consumption in a tilt correcting coil of a monitor, said method comprising the steps of:*

*providing a tilt correcting signal for correcting a tilt of an image to said tilt correcting coil of said monitor when operating said monitor in a mode corresponding to normal power consumption for said monitor; and*

*reducing power consumption of said tilt correcting coil of said monitor by withholding said tilt correcting signal from being used by said tilt correcting coil of said monitor when operating said monitor in a mode corresponding to reduced power consumption for said monitor.*

*38. The method as set forth in claim 37, further comprised of providing said tilt correcting signal to correspond to a tilt correcting pulse width modulated signal.*

*39. A method for controlling power consumption in a tilt correcting coil of a monitor, said method comprising the steps of:*

*providing a tilt correcting signal for correcting a tilt of an image to said tilt correcting coil of said monitor when operating said monitor in an activity state corresponding to normal power consumption for said monitor; and*

*withholding said tilt correcting signal from being used by said tilt correcting coil of said monitor when operating said monitor in an activity state corresponding to reduced power consumption for said monitor.*

*40. The method as set forth in claim 39, further comprised of providing said tilt correcting signal to correspond to a tilt correcting pulse width modulated signal.*

*41. The method as set forth in claim 39, further comprised of said activity state corresponding to normal power consumption for said monitor and said activity state corresponding to reduced power consumption for said monitor each respectively corresponding to a power supply mode of a display power management system (DPMS).*

*42. A method for controlling power consumption in a tilt correcting coil of a monitor, said method comprising the steps of:*

*providing a tilt correcting signal for correcting a tilt of an image to said tilt correcting coil of said monitor when both a horizontal synchronizing signal and a vertical synchronizing signal are received by said monitor; and*

*withholding said tilt correcting signal from being used by said tilt correcting coil of said monitor when any of said horizontal synchronizing signal and said vertical synchronizing signal is not received by said monitor to reduce power consumption of said tilt correcting coil of said monitor.*

*43. The method as set forth in claim 42, further comprised of providing said tilt correcting signal to correspond to a tilt correcting pulse width modulated signal.*

*44. A method for controlling power consumption in a tilt correcting coil of a monitor, said method comprising the step of:*

*using a tilt correcting signal by said tilt correcting coil of said monitor for correcting a tilt of an image only when both a horizontal synchronizing signal and a vertical synchronizing signal are received by said monitor.*

*45. The method as set forth in claim 44, further comprised of providing said tilt correcting signal to correspond to a tilt correcting pulse width modulated signal.*

*46. A method for controlling power consumption in a tilt correcting coil of a monitor, said method comprising the step of:*

*preventing a tilt correcting signal from being used by said tilt correcting coil of said monitor when any of a horizontal synchronizing signal and a vertical synchronizing signal is not received by said monitor, said tilt correcting signal for correcting a tilt of an image.*

*47. A method for controlling power consumption in a tilt correcting coil of a monitor, comprising the step of:*

*in absence of any of a horizontal synchronizing signal and a vertical synchronizing signal being received by said monitor, withholding supplying of a tilt correcting signal to said tilt correcting coil of said monitor, said tilt correcting signal for correcting a tilt of an image.*

*48. A method for controlling power consumption in a tilt correcting coil of a monitor, said method comprising the step of:*

*enabling correcting a tilt of an image by said tilt correcting coil of said monitor by said tilt correcting coil using a tilt correcting signal only when both a horizontal synchronizing signal and a vertical synchronizing signal are received by said monitor.*

*49. An apparatus for controlling power consumption in a tilt correcting coil of a monitor, said apparatus comprising:*

*a tilt correcting coil of said monitor for correcting a tilt of an image; and*

*tilt correcting signal circuitry for providing a tilt correcting signal for correcting said tilt of said image to said tilt correcting coil of said monitor and for enabling correcting said tilt of said image by enabling using said tilt correcting signal only when both a horizontal synchronizing signal and a vertical synchronizing signal are received by said tilt correcting signal circuitry.*

*50. The apparatus as set forth in claim 49, further comprised of said tilt correcting signal corresponding to a tilt correcting pulse width modulated signal.*

*51. An apparatus for controlling power consumption in a tilt correcting coil of a monitor, said apparatus comprising:*

*a tilt correcting coil of a monitor for correcting a tilt of an image; and*

*tilt correcting signal circuitry for enabling correction of said tilt of said image by said tilt correcting coil of said monitor using a tilt correcting signal when both a horizontal synchronizing signal and a vertical synchronizing signal are received by said tilt correcting signal circuitry, and said tilt correcting signal circuitry for preventing said tilt correcting signal from being used by said tilt correcting coil of said monitor when any one of said horizontal synchronizing signal and said vertical synchronizing signal is not received by said tilt correcting signal circuitry.*

*52. The apparatus as set forth in claim 51, further comprised of said tilt correcting signal corresponding to a tilt correcting pulse width modulated signal.*

*53. A computer storage medium including a set of instructions implementing a method for controlling power consumption in a tilt correcting coil of a monitor, said set of instructions comprising one or more instructions for:*

*correcting a tilt of an image by said tilt correcting coil of said monitor using a tilt correcting signal when both a horizontal synchronizing signal and a vertical synchronizing signal are received by said monitor; and*

*preventing said tilt correcting signal from being used by said tilt correcting coil of said monitor when any of said horizontal synchronizing signal and said vertical synchronizing signal is not received by said monitor to reduce power consumption of said tilt correcting coil of said monitor.*

*54. The computer storage medium as set forth in claim 53, further comprised of said computer storage medium being comprised by a microcomputer.*

*55. A computer storage medium including a set of instructions implementing a method for controlling power consumption in a tilt correcting coil of a monitor, said set of instructions comprising one or more instructions for:*

*enabling using a tilt correcting signal for correcting a tilt of an image by said tilt correcting coil of said monitor only when both a horizontal synchronizing signal and a vertical synchronizing signal are received by said monitor.*

*56. The computer storage medium as set forth in claim 55, further comprised of said set of instructions comprising one of more instructions for:*

*providing said tilt correcting signal to correspond to a tilt correcting pulse width modulated signal.*

*57. The computer storage medium as set forth in claim 55, further comprised of said computer storage medium being comprised by a microcomputer.*

* * * * *